United States Patent
Serebryanov et al.

(10) Patent No.: US 11,156,494 B2
(45) Date of Patent: Oct. 26, 2021

(54) CONTINUOUS LIQUID LEVEL MEASUREMENT DETECTOR FOR CLOSED METAL CONTAINERS

(71) Applicant: Applied Materials, Inc., Santa Clara, CA (US)

(72) Inventors: Oleg V. Serebryanov, San Jose, CA (US); Alexander Goldin, San Jose, CA (US); Kenric Choi, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 15/370,089

(22) Filed: Dec. 6, 2016

(65) Prior Publication Data

US 2017/0160123 A1    Jun. 8, 2017

Related U.S. Application Data

(60) Provisional application No. 62/263,737, filed on Dec. 6, 2015.

(51) Int. Cl.
*G01F 23/74* (2006.01)

(52) U.S. Cl.
CPC .................... *G01F 23/74* (2013.01)

(58) Field of Classification Search
CPC .......... G01F 23/72; G01F 23/74; G01F 23/62; G01F 1/24; G01F 23/0038; G01F 23/265; G01F 23/38; G01F 23/46; G01F 23/546
See application file for complete search history.

(56) References Cited

U.S. PATENT DOCUMENTS

| 2,920,484 | A | * | 1/1960 | Reichert | G01F 23/66 73/319 |
| 4,194,397 | A | * | 3/1980 | Yasuda | G01F 23/66 73/314 |
| 4,275,774 | A | | 6/1981 | Andersen et al. | |
| 4,447,743 | A | * | 5/1984 | Bean | G01F 23/683 137/392 |
| 4,457,171 | A | * | 7/1984 | Gebauer | G01F 23/72 73/305 |
| 4,466,284 | A | | 8/1984 | Dumery | |
| 4,796,472 | A | * | 1/1989 | Lew | G01F 23/70 200/84 C |
| 4,955,231 | A | * | 9/1990 | Mahoney | G01F 23/72 200/84 C |

(Continued)

FOREIGN PATENT DOCUMENTS

| DE | 4128178 A1 * | 2/1993 | ............ G01F 23/74 |
| JP | 2001141547 A | 5/2001 | |
| SU | 1700380 A1 * | 12/1991 | |

OTHER PUBLICATIONS

Austenitic Stainless Steels, Chapter 6 (partial), ASM International, 2008. (Year: 2008).*

(Continued)

*Primary Examiner* — David A. Rogers
(74) *Attorney, Agent, or Firm* — Servilla Whitney LLC

(57) ABSTRACT

Apparatus and methods for determining the liquid level of a canister are described. A magnetic field generated by a floating magnet within the canister is measured by a plurality of magnetic sensors outside of the canister. Methods of calibrating the magnetic sensors and measuring the location of the floating magnet are also described.

7 Claims, 3 Drawing Sheets

(56) References Cited

U.S. PATENT DOCUMENTS

| | | | | |
|---|---|---|---|---|
| 5,056,049 A * | 10/1991 | O'Neill | G01B 7/003 | 340/623 |
| 5,253,521 A * | 10/1993 | Abramovich | G01F 23/0076 | 324/207.21 |
| 5,347,864 A * | 9/1994 | Senghaas | G01F 23/0069 | 200/84 C |
| 5,565,687 A * | 10/1996 | Berrill | G01D 5/145 | 250/577 |
| 5,636,548 A | 6/1997 | Dunn et al. | | |
| 5,793,200 A * | 8/1998 | Berrill | G01D 5/145 | 324/207.12 |
| 5,860,316 A * | 1/1999 | Berrill | G01F 23/265 | 340/620 |
| 5,950,487 A * | 9/1999 | Maresca, Jr. | G01F 23/706 | 250/577 |
| 6,028,521 A | 2/2000 | Issachar | | |
| 6,067,855 A | 5/2000 | Brown et al. | | |
| 6,430,380 B2 * | 8/2002 | Kawakami | B41J 2/17566 | 399/57 |
| 6,502,461 B2 * | 1/2003 | Keller | G01F 23/38 | 73/290 R |
| 6,539,796 B2 * | 4/2003 | Shirai | C23C 16/4482 | 73/290 R |
| 6,563,306 B2 * | 5/2003 | Sato | G01B 7/003 | 324/207.2 |
| 7,597,758 B2 | 10/2009 | Chen et al. | | |
| 7,775,508 B2 * | 8/2010 | Choi | C23C 16/4481 | 261/123 |
| 8,237,443 B2 * | 8/2012 | Hopmann | E21B 47/0905 | 137/38 |
| 8,549,911 B2 * | 10/2013 | Rudd | G01F 23/74 | 73/313 |
| 9,335,201 B2 * | 5/2016 | Huang | G01F 23/76 | |
| 9,506,994 B2 * | 11/2016 | Mulholland | G01D 5/204 | |
| 10,712,194 B2 * | 7/2020 | Payne | G01F 23/0069 | |
| 10,859,399 B2 * | 12/2020 | Burgess | G01F 23/72 | |
| 2002/0005715 A1 * | 1/2002 | Sato | G01B 7/003 | 324/207.2 |
| 2002/0145210 A1 * | 10/2002 | Tompkins | B01F 3/04007 | 261/121.1 |
| 2005/0028841 A1 * | 2/2005 | Zorich | B08B 9/00 | 134/26 |
| 2005/0056092 A1 * | 3/2005 | Kowalski | G01F 23/74 | 73/313 |
| 2005/0109105 A1 * | 5/2005 | Kowalski | G01F 23/74 | 73/313 |
| 2005/0249873 A1 * | 11/2005 | Sarigiannis | C23C 16/4481 | 427/248.1 |
| 2007/0186648 A1 * | 8/2007 | Harmon | G01F 23/68 | 73/319 |
| 2008/0099933 A1 * | 5/2008 | Choi | C23C 16/4481 | 261/52 |
| 2008/0149031 A1 * | 6/2008 | Chu | C23C 16/4481 | 118/726 |
| 2008/0182425 A1 * | 7/2008 | Spohn | C23C 16/4409 | 438/758 |
| 2008/0213476 A1 * | 9/2008 | Spohn | C23C 16/4409 | 427/255.23 |
| 2009/0011129 A1 * | 1/2009 | Ganguli | C23C 16/18 | 427/255.394 |
| 2009/0036796 A1 | 2/2009 | Rising et al. | | |
| 2009/0060546 A1 * | 3/2009 | Tanaka | G01F 23/72 | 399/57 |
| 2010/0000317 A1 * | 1/2010 | Bron | A47J 27/2105 | 73/313 |
| 2010/0112215 A1 * | 5/2010 | Cuvalci | C23C 16/4482 | 427/255.28 |
| 2010/0119734 A1 * | 5/2010 | Choi | C23C 16/4481 | 427/593 |
| 2011/0138907 A1 * | 6/2011 | Rudd | G01F 23/74 | 73/313 |
| 2012/0279295 A1 * | 11/2012 | D'Angelo | G01F 23/74 | 73/305 |
| 2013/0049743 A1 * | 2/2013 | Sawano | G01F 1/24 | 324/207.24 |
| 2013/0111987 A1 * | 5/2013 | Ciani | B22D 11/186 | 73/290 R |
| 2013/0319015 A1 * | 12/2013 | Carlson | F25B 21/02 | 62/3.6 |
| 2014/0242806 A1 * | 8/2014 | Knapp | H01L 21/02175 | 438/758 |
| 2015/0153214 A1 | 6/2015 | Huang et al. | | |
| 2016/0052655 A1 | 2/2016 | Nguyen et al. | | |
| 2016/0123790 A1 * | 5/2016 | Suk | G01V 1/159 | 73/313 |
| 2017/0074715 A1 * | 3/2017 | Bartos | G01F 23/76 | |
| 2017/0102261 A1 * | 4/2017 | Payne | G01D 5/145 | |

OTHER PUBLICATIONS

"Which Pole Is North", K&J Magnetics, Aug. 10, 2014 (Year: 2014).*
Official Translation of SU-1700380-A1 which originally published on Dec. 23, 1991. (Year: 1991).*
Machine Translation of DE-4128178-A1 which originally published Feb. 25, 1993. (Year: 1993).*
PCT International Search Report and Written Opinion in PCT/US2016/065076 dated Mar. 17, 2017, 12 pages.
PCT International Preliminary Report on Patentability in PCT/US2016/065076 dated Jun. 21, 2018, 9 pages.
"Is stainless steel non-magnetic?", British Stainless Steel Association, Frequently Asked Questions—Technical Help, https://www.bssa.org.uk/faq.php?id=24, Retrieved on Jun. 26, 2019.

* cited by examiner

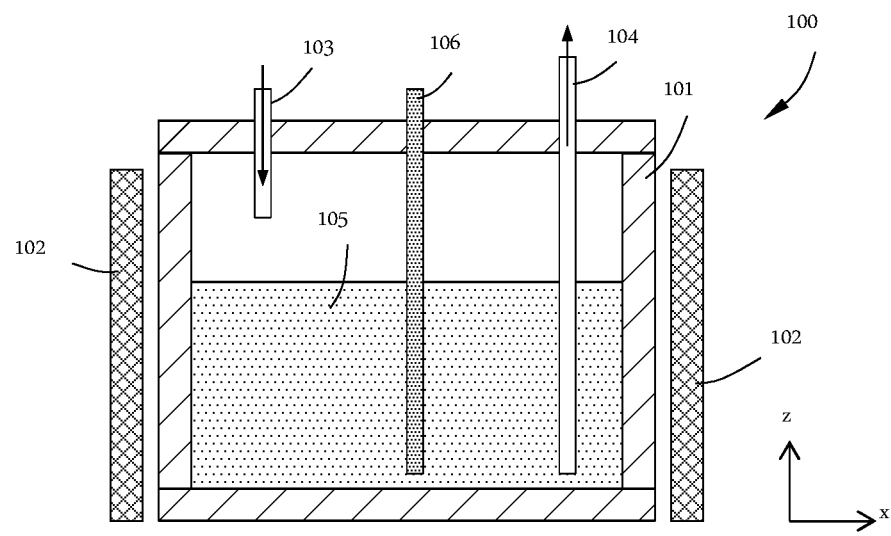
FIG. 1 – PRIOR ART
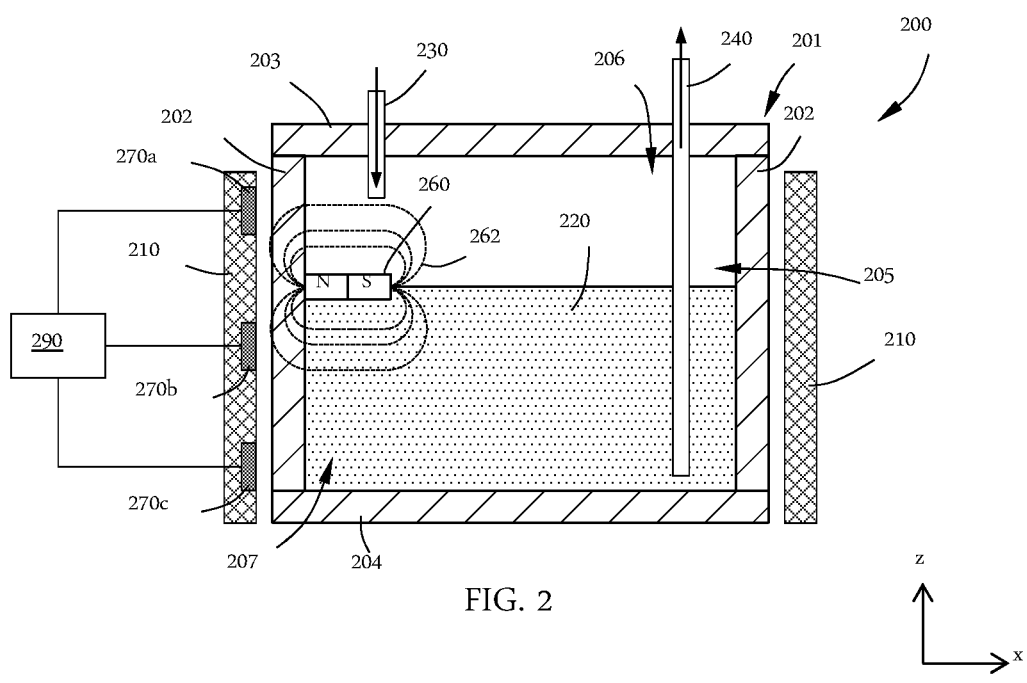
FIG. 2

CONTINUOUS LIQUID LEVEL MEASUREMENT DETECTOR FOR CLOSED METAL CONTAINERS

CROSS-REFERENCE TO RELATED APPLICATIONS

This application claims priority to U.S. Provisional Application No. 62/263,737, filed Dec. 6, 2015, the entire disclosure of which is hereby incorporated by reference herein.

TECHNICAL FIELD

The present disclosure relates generally to methods and apparatus for measuring the level of the liquid in the container. More specifically, embodiments of the disclosure relate to the measurement of liquid levels in temperature controlled chemicals using magnetic sensors.

BACKGROUND

Many processes, for example, semiconductor manufacturing, use methods and apparatus to measure the amount of a liquid or a fluid within a container. Conventional systems and methods of detecting the level of liquid in an ampoule are invasive and only provide discrete points (ultra-sonic and reed switch). A failure of a level sensor would require the ampoule to be returned to the chemical supplier.

Conventional apparatus suffer from several issues that affect the accuracy of the measurements. Variations in the magnetic field which affect the results can occur from, for example, variations of the horizontal position of the floating magnet, orientation of the poles of the floating magnet, and variation of the magnetic field due to variation of magnetic properties of the materials and/or chemical ampule or temperature.

Therefore, there is a need in the art for apparatus and methods to accurately and repeatedly measuring the level of a fluid within a container.

SUMMARY

One or more embodiments of the disclosure are directed to level measurement systems comprising a canister comprising a sidewall, a top and a bottom defining an interior volume to contain a fluid. A floating magnet is within the interior volume. At least two magnetic sensors are outside of the canister and adjacent the sidewall.

Additional embodiments of the disclosure are directed to level measurement systems comprising a precursor ampoule comprising a canister with a sidewall, a top and a bottom defining an interior volume to contain a precursor. A floating magnet is within the interior volume of the ampoule. The floating magnet has a density lower than a density of the precursor. A heater is outside of the canister and adjacent the sidewall. At least four magnetic sensors are outside of the canister and adjacent the sidewall. A microprocessor is connected to each of the magnetic sensors.

Further embodiments of the disclosure are directed to methods of measuring a fluid level in a canister. A plurality of magnetic sensors are calibrated. The calibrated sensors are positioned adjacent the canister. The canister has a fluid and a floating magnet within an interior volume thereof. A magnetic field from the floating magnet is measured using the plurality of calibrated magnetic sensors. A position of the floating magnet is determined within the canister based on an output of the calibrated magnetic sensors.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 shows a cross-sectional schematic view of a fluid level measuring device in accordance with one or more embodiment of the disclosure;

FIG. 2 shows a cross-sectional schematic view of a fluid level measuring device in accordance with one or more embodiment of the disclosure;

DETAILED DESCRIPTION

Figure 3:
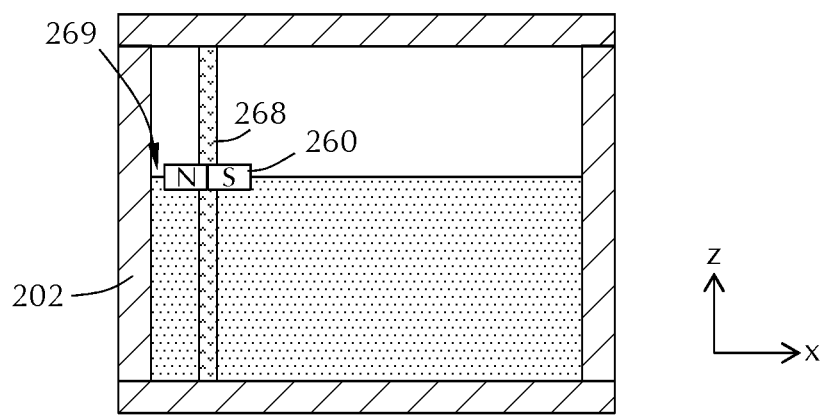
FIG. 3 shows a cross-sectional schematic view of a fluid level measuring device in accordance with one or more embodiment of the disclosure.

Before describing several exemplary embodiments of the disclosure, it is to be understood that the disclosure is not limited to the details of construction or process steps set forth in the following description. The disclosure is capable of other embodiments and of being practiced or being carried out in various ways.

FIG. 1 shows an apparatus 100 for generating a chemical precursor comprising a precursor ampoule 101 and resistive heater 102. The ampule 101 has an inlet 103 and an outlet 104. The level of a liquid 105 is measured by sensor 106. Level sensors 106 like the variety shown are invasive and, in the case of failure, the sensor 106 cannot be replaced without sending the ampoule back to the chemical supplier.

Some embodiments incorporate an ampoule magnet which floats inside the ampoule with magnetic sensors outside the ampoule. Systems of this sort have low accuracy because replacement of an empty ampoule with a new one does not allow for calibration of the level measurement because parameters of the floating magnet (e.g., position of magnet with respect to the sensors) will vary from ampoule to ampoule. Other variables include, but are not limited to, magnetic permeability of the stainless steel used in ampoule which may change from ampoule to ampoule. Therefore, the level measured by the sensor magnetic field will vary even at the same level of liquid in ampoule.

FIG. 2 shows a system 200 in accordance with one or more embodiment of the disclosure. The system 200 comprises a canister 201, which may be a chemical ampoule. The canister 201 includes a sidewall 202, a top portion 203 and a bottom portion 204. The canister 201 defines an interior volume 205 having an upper region 206 and a lower region 207.

A heater 210 surrounds the canister 201. The heater 210 creates a temperature gradient between the upper region 206 and the lower region 207 in the interior volume 205 of the canister 201. The heater 210 elevates the temperature of a precursor 220 to generate a precursor gas by sublimating or vaporizing the precursor 220 so that gaseous precursor accumulates in the upper region 206 of the canister 201. The gaseous precursor can be swept out of the canister 201 by an inert carrier gas entering through inlet port 230 and exiting outlet port 240. While the inlet port 230 is shown extending into the upper region 206 and the outlet port 240 is shown extending into the lower region 207, those skilled in the art will understand that the inlet port 230 and outlet port 240 can extend to any suitable depth within the interior volume 205 of the canister 201. For example, in some embodiments, the inlet port 230 extends into the lower region 207 of the canister 201 to allow the inert gas to bubble through or pass through the precursor 220. In one or more embodiments, the inlet port 230 extends into the lower region 207 of the canister 201 and may contact the precursor 220. In some embodiments, the outlet port 240 extends into the upper region 206 of the canister 201 and does not contact the precursor 220. In one or more embodiments, the outlet port 240 extends into the lower region 207 of the canister 201 and may contact the precursor 220.

The heater 210 can be any suitable heater including, but not limited to, resistive heaters. In some embodiments, the precursor 220 is heated to a predefined temperature by a heater 210 disposed proximate to the sidewall 202. In some embodiments, the heater 210 is configured to create a temperature gradient between a lower region 207 of the canister 201 and the upper region 206 of the canister 201. The lower region 207 can be colder than or warmer than the upper region 206. The temperature gradient may range from about 5° C. to about 15° C.

A floating magnet 260 is within the canister 201. The floating magnet 260 can be made of any suitable material. In some embodiments, the floating magnet 260 has a density less than the precursor 220. The size of the floating magnet 260 can be any suitable size. For example, the length of the floating magnet 260 is less than the distance between the side walls 202 of the canister 201. The strength of the magnetic field 262 of the floating magnet 260 is sufficient to be measured outside of the canister 201.

The floating magnet 260 can be free floating within the canister 201 or can be partially fixed in place. In some embodiments, the magnet is allowed to float on the precursor without additional structural support. In some embodiments, as shown in FIG. 3, the floating magnet 260 is connected to a guide 268 that extends along the z-axis of the canister 201 to allow the floating magnet 260 to move up and down with the precursor level unhindered. The guide 268 prevents the magnet from moving along the x- or y-axes to maintain a substantially uniform distance 269 between the floating magnet 260 and the sidewall 202. As used in this manner, the term "substantially uniform distance" means that the distance between the floating magnet 260 and the sidewall 202 is within ±10% of the average distance 269.

Magnetic sensors 270a, 270b, 270c are located outside the canister 201. The number of magnetic sensors can vary depending on, for example, the magnetic field 262 strength of the floating magnet 260 and the height of the canister 201 (i.e., the length of the sidewall 202 of the canister 201). In some embodiments, there are at least three magnetic sensors. In some embodiments, there are at least four magnetic sensors. In various embodiments, there are in the range of about 2 to about 10 magnetic sensors, or in the range of about 3 to about 9 magnetic sensors, or in the range of about 4 to about 8 magnetic sensors.

The magnetic sensors 270 can be any suitable magnetic sensor. Suitable sensors include, but are not limited to, MEMS-based magnetic field sensors. An exemplary magnetic sensor for use with embodiments of the disclosure is a Hall effect sensor. A Hall effect sensor is a transducer which provides a variable voltage output as a function of or in response to a magnetic field.

The spacing between the magnetic sensors 270 can be varied. The distance between adjacent sensors should be great enough to show a measurable difference between the magnetic field when the floating magnet is asymmetrically positioned. Therefore, the distance between the magnetic sensors may be a function of, at least, the dynamic operating range of the sensors. The spacing and number of magnetic sensors may also be based on the magnetic field strength of the floating magnet. The higher the magnetic field strength, the less magnetic sensors may be used. A floating magnet with a lower magnetic field strength may use a larger number of magnetic sensors than a higher field magnet. In some embodiments, the number of magnetic sensors is based on the height of the ampoule so that there are a fixed number of sensors per unit height. In one or more embodiments, magnetic sensors are positioned in the range of 0.5 inch to 2.5 inches apart, or in the range of about 1 inch to about 2 inches apart, or in the range of about 1 cm to about 7.5 cm apart, or in the range of about 2 cm to about 5 cm apart.

A microprocessor 280 is connected to the magnetic sensors 270a, 270b, 270c. The microprocessor 280 can be any suitable microprocessor that can obtain measurements from the magnetic sensors. The microprocessor 280 can be a stand-alone component or part of a larger processing system.

Figure 4:
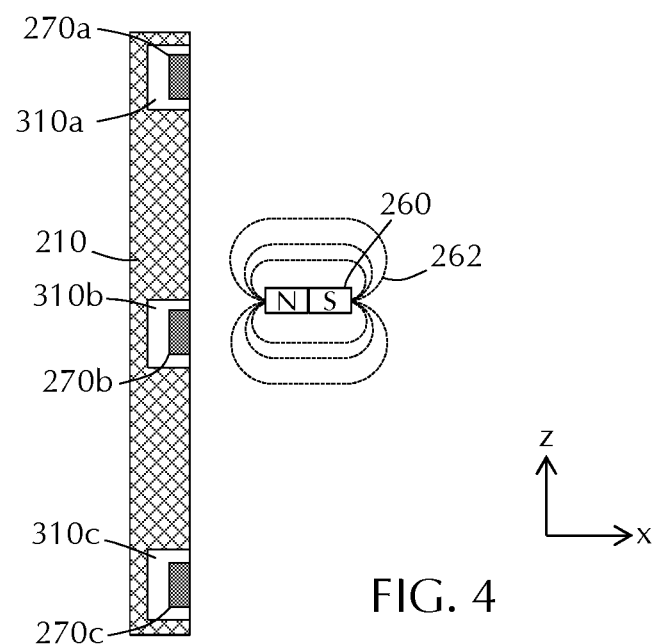
FIG. 4 shows a cross-sectional schematic view of a fluid level measuring device in accordance with one or more embodiment of the disclosure.

Referring to FIG. 4, the magnetic sensors 270a, 270b, 270c of some embodiments are mounted in cavities 310a, 310b, 310c, respectively, located in heater 210. While only three cavities are shown, those skilled in the art will understand that there can be any suitable number of cavities. For example, in an embodiment having four magnetic sensors, there might be four cavities in the heater allowing a magnetic sensor to be positioned within each cavity. The cavities 310a, 310b, 310c can be precisely positioned to allow precise positioning of the magnetic sensors 270a, 270b, 270c. In some embodiments, mounting the magnetic sensors in cavities allows the ampoule to be replaced without disturbing the position of the magnetic sensors.

In use, the floating magnet 260 creates magnetic field 262 which can be measured by at least two of magnetic sensors 270a, 270b, 270c. In the embodiment shown in FIG. 4, magnetic sensors 270a and 270b can measure magnetic field 260. Magnetic sensor 270c may be too far from the floating magnet 260 to enable any appreciable measurement of magnetic field 262.

Figure 5:
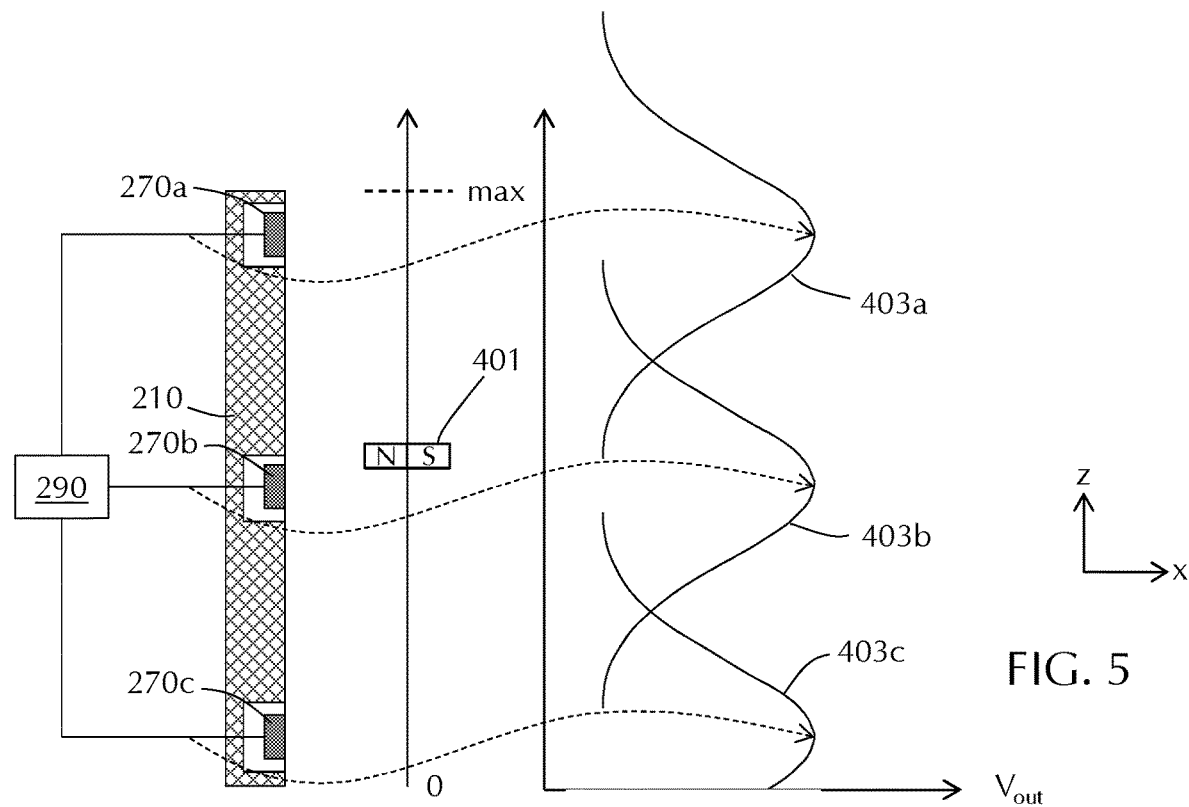
FIG. 5 shows a cross-sectional schematic view of a fluid level measuring device in accordance with one or more embodiment of the disclosure.

With reference to FIG. 5, calibration of the system is performed at least once without a container 201 (e.g., a chemical ampoule). During the calibration, a permanent magnet 401 is moved along the z-axis relative to the magnetic sensors 270a, 270b, 270c. Calibration data is measured at several positions along the axis of movement of the permanent magnet. The readings of 403a, 403b, 403c outputs of the sensors is acquired by microprocessor 280. The microprocessor 280 calculates ratios of signals of two sensors (e.g., 403a/403b, 403b/403c, and 403a/403c) and stores that data in memory which is part of the microprocessor 280 or a peripheral associated with the microprocessor. In some embodiments, more than two sensors to measure the position of the permanent magnet 401 and the microprocessor 280 calculates or record the values of the magnetic sensors 270a, 270b, 270c.

In one or more embodiments, the variation of the X-Y position of the permanent magnet 401 within the canister 201 has substantially no effect on the determination of the z-position of the magnet. In some embodiments, the variation of the X-Y magnet position equally affects the adjacent sensors. For example, in some embodiments, the accuracy of the calculation of the magnet position is independent of the absolute value of the magnetic field measurements.

Figure 6:
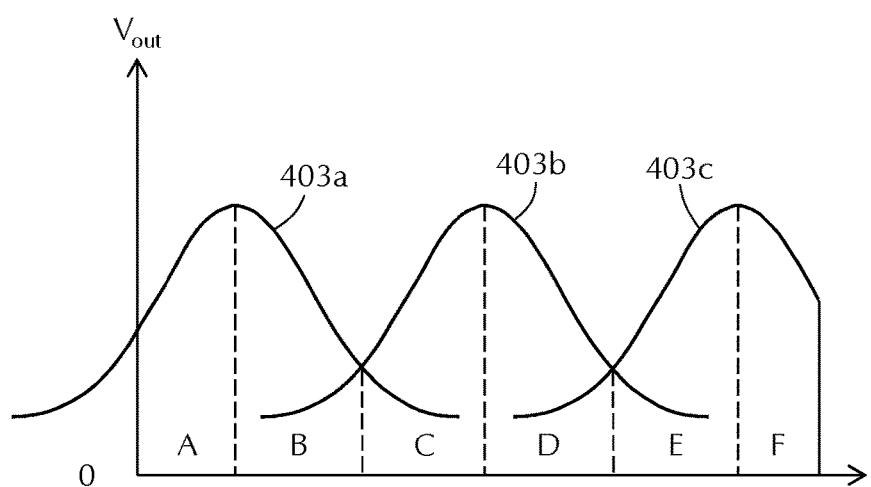
FIG. 6 shows a graph of the voltage output of magnetic sensors according to one or more embodiment of the disclosure.

Referring to FIG. 6, in use, the level of liquid in the canister 201 is determined based on readings from the sensors 270 as determined by the microprocessor 280 based on the calibrated data. The microprocessor 280 defines the region that the floating magnet 260 is located within. For example, (403a<403b) AND (403b>403c) AND (403a>403c) defines region C. After defining the region, the position of the floating magnet 260 can be calculated based on the ratio of the magnetic field readings for the region. The location of the floating magnet within region C is based on the voltage output contributions from magnetic sensor 270a and 270b. There may also be some contribution from magnetic sensor 270c in addition depending on the proximity of the magnetic sensors to each other and the strength of the magnetic field of the floating magnet. In some embodiments, the location of the floating magnet is determined based on the output from less than all of the magnetic sensors. In some embodiments, the location of the floating magnet is determined based on the output from all of the magnetic sensors. In some embodiments, the location of the floating magnet is determined based on the two magnetic sensors closest to the region in which the magnet occupies.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method of measuring a fluid in a canister, the method comprising:
    calibrating at least three magnetic sensors by a process comprising:
        moving a permanent magnet along an axis defined by the at least three magnetic sensors without a canister present;
        measuring output voltages of the magnetic sensors based on a magnetic field of the permanent magnet; and
        storing ratios of the output voltages provided by the magnetic sensors;
    positioning the canister adjacent to the sensors, the canister having the fluid and a floating magnet on the surface of the fluid within an interior volume of the canister, the floating magnet allowed to float freely within the canister;
    measuring a magnetic field from the floating magnet using the at least three calibrated magnetic sensors, each sensor outputting a positive voltage representative of the magnetic field generated by the floating magnet; and
    determining a position of the floating magnet within the canister based on a ratio of the voltage of the calibrated magnetic sensors.

2. The method of claim 1, wherein determining the position of the floating magnet within the canister comprises:
    measuring output voltages of the magnetic sensors based on the magnetic field of the floating magnet within the canister;
    determining a region that the floating magnet is located within based on the output voltages provided by the magnetic sensors; and
    determining the position within the region based on the stored ratios of the output voltages provided by the magnetic sensors.

3. The method of claim 1, wherein the fluid is a liquid.

4. The method of claim 1, wherein the fluid is a precursor.

5. The method of claim 1, wherein the at least three magnetic sensors are located within cavities in a heater.

6. The method of claim 1, wherein the canister is a precursor ampoule.

7. The method of claim 1, wherein the canister comprises stainless steel.

* * * * *